Apr. 24, 1923.
1,452,855
H. F. TOWNER
SELF LIFT FOR AGRICULTURAL IMPLEMENTS
Filed May 2, 1921  2 Sheets-Sheet 1
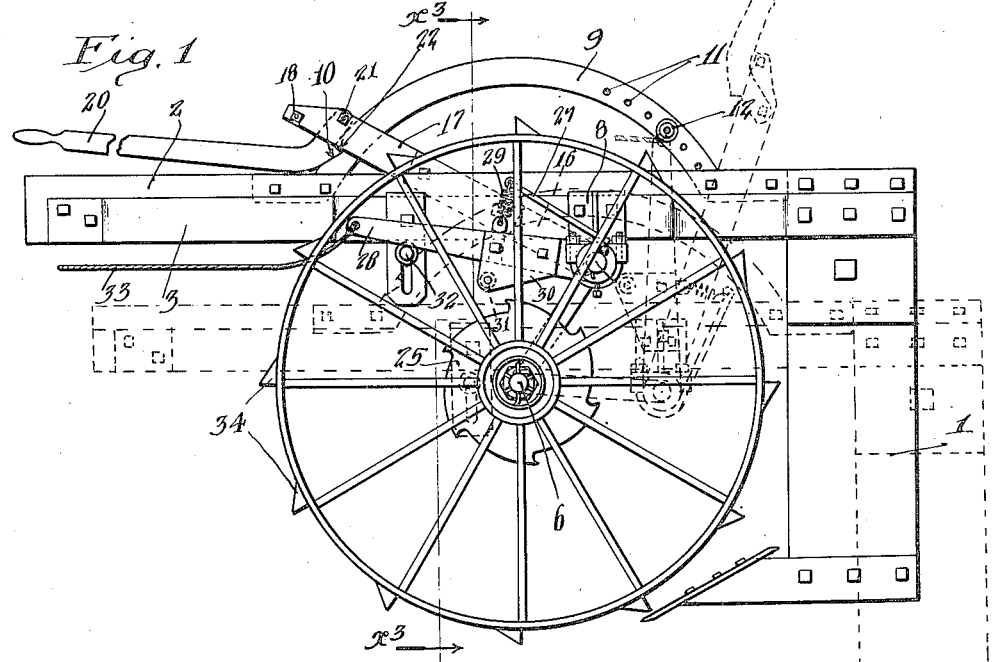
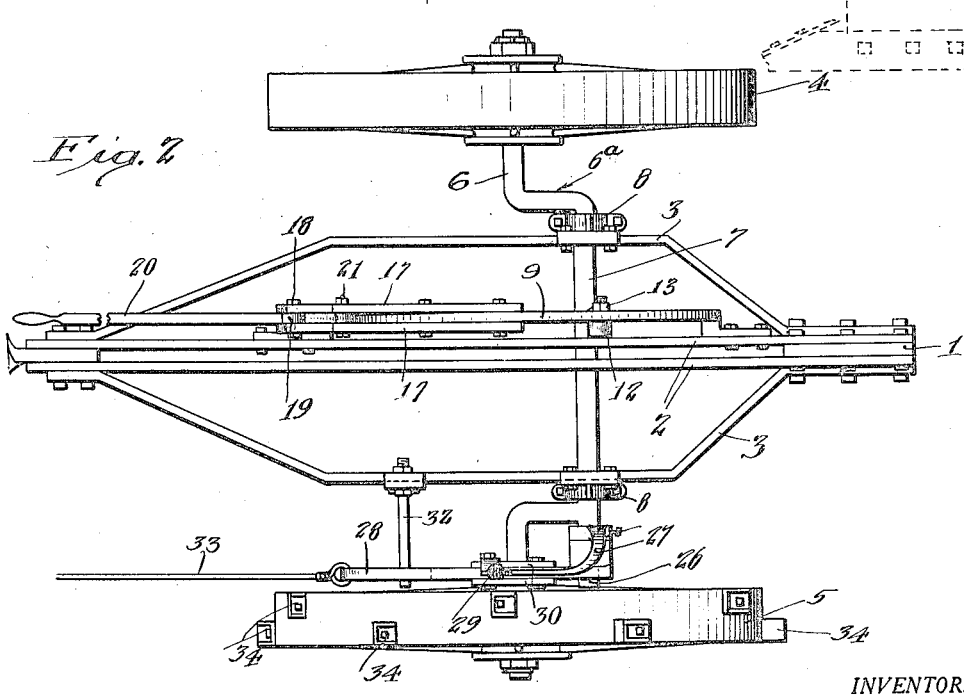
INVENTOR.
Heber F. Towner
BY
ATTORNEY.

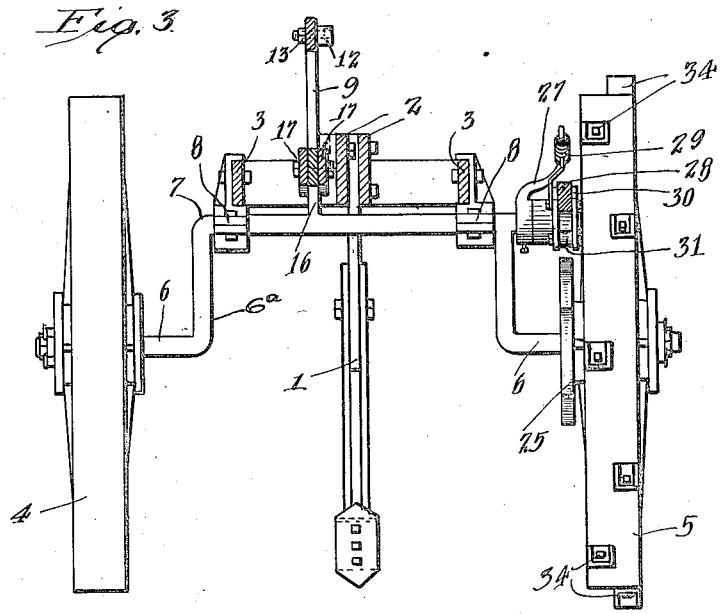
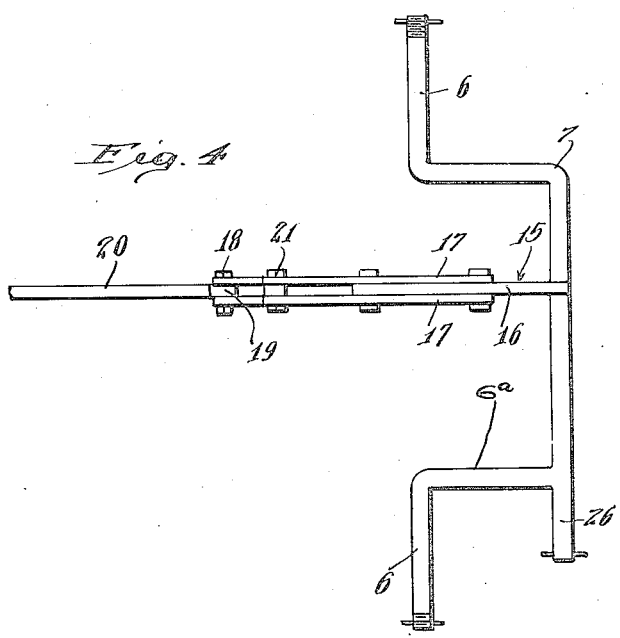

Patented Apr. 24, 1923.

1,452,855

UNITED STATES PATENT OFFICE.

HEBER F. TOWNER, OF SANTA ANA, CALIFORNIA.

SELF-LIFT FOR AGRICULTURAL IMPLEMENTS.

Application filed May 2, 1921. Serial No. 466,188.

*To all whom it may concern:*

Be it known that I, HEBER F. TOWNER, a citizen of the United States, residing at Santa Ana, in the county of Orange and State of California, have invented a new and useful Self-Lift for Agricultural Implements, of which the following is a specification.

This invention relates to ground working implements and is particularly directed to a wheel supported implement adapted to be drawn by tractor or draft animals, and of the type including mechanism for raising and lowering the ground working tool to withdraw the tool from the ground and to permit the tool to lower to penetrate the ground to the depth to which it is desired to work the soil.

The object of the invention is to provide an implement of the above character with means constituting a power lift functioning during the travel of the implement to lift the tool blade out of the ground.

A further object is to incorporate with said power lift, means for regulating the depth of penetration of the tool blade into the ground during a ground working operation.

Various other objects and advantages will be more fully apparent from the following description of the accompanying drawings, which form a part of this disclosure, and which illustrate a preferred form of embodiment of the invention.

Of the drawings:

Figure 1 is an elevation of the implement, showing in dotted lines the position of the mechanism when the tool is engaged in the ground.

Fig. 2 is a top plan view.

Fig. 3 is a section on line $x^3$—$x^3$ of Fig. 1.

Fig. 4 is a detail plan view of the axle and connected parts.

In the drawings the invention is illustrated as incorporated with a sub-soil plow but it is obvious that it could be incorporated with other types of ground working tools with equally as good results.

In the present instance the sub-soil plow 1 is dependingly supported on the rear end of a frame which comprises two medial parallel beams 2 and two outer beams 3, the beams 3 and the beams 2 being secured together at their terminal ends and the medial portions of the beams 3 being bowed transversely as shown in Figure 2. Ground wheels 4, 5 are loosely journaled on necks at the ends of a crank-shaft 6, the same being connected by crank arms 6ᵃ with the medial crank-pin portion 7 of said shaft which is journaled in bearing blocks 8 secured to the medial portions of the respective beams 3 of the frame.

A quadrant beam 9 is secured at its opposite ends to one of the frame beams 2 and has at its forward end a single notch 10 while its rear portion is provided with a series of holes 11. A stop stud 12 is inserted in one of the holes 11 and secured in position by a nut 13 (see Fig. 2) the position of the stud determining the depth to which the tool may be lowered, as will be described. From the above it will be seen that the crank-shaft is journaled in the two ground wheels and that the frame of the implement is journaled on the crank-pin portion of the crank-shaft. Also it will be evident that if the crank-pin portion of the crank-shaft is held against rotation relative to the frame, the frame could not be lowered. Therefore, I provide mechanism which will function to prevent such rotation of the crank-shaft relative to the frame to maintain the frame in elevated position until released and to limit such rotation of the crank-shaft when released to regulate the distance the frame may be lowered. This mechanism includes an arm 15 which is fixed to the crank-pin portion 7 of the crank-shaft and extends radially therefrom at an approximate ninety degree angle from the crank arms of the shaft. (See Fig. 1.) In preferred form the arm 15 consists of a short projection 16 formed integral with the shaft (see Fig. 4) and two side plates 17 bolted on opposite sides of said projection with their outer ends extending on opposite sides of the quadrant beam 9 and secured together by a bolt 18 and maintained in spaced relation by a spacing collar 19 surrounding said bolt. A hand latch lever 20 is positioned between the side plates 17 of the arm 15 and is pivoted on a bolt 21, said lever having a tooth 22 adapted to engage into the quadrant notch 10.

With the above described arrangement it will be evident that while the tooth 22 of the lever 20 is engaged in the notch 10 of the quadrant the crank-shaft is permitted no rotary-movement relative to the frame and the frame will thus be maintained in elevated position. Also will it be evident that upon releasing the latch lever 20 from engagement with the notch 10, the frame will lower by its own weight until the arm 15 contacts with the stop stud 12 to limit the lowering of the tool to the depth predetermined by the selective setting of said stud 12.

To elevate the frame to withdraw the tool from the soil said frame and tool must be bodily lifted to the full line position illustrated in Figure 1, in which instance the latch lever 20 will, by gravity, again engage the notch 10 in the quadrant to maintain the frame in elevated position until again released.

Describing the power lift, 25 designates a toothed disc which is secured to the ground wheel 5, and 26 designates a stud extension or crank pin spur, in substantial alignment with the crank pin 7 and located on the outer side of the adjacent crank arm 6ª. An arm 27 is adjustably secured on the stud 26 and a second arm 28, which may be termed a clutch arm, is loosely journaled on the stud 26, a spring 29 connecting the clutch arm 28 and the outer end of the arm 27. (See Fig. 1.) Plates 30 are fixed on opposite sides of the arm 28 and pivoted between said plates is a roller 31 in alignment with the plane of the toothed disc 25. The arm 28 normally rests on a stud 32 supported in a bracket on the frame, said stud being clamped in adjusted position in a vertical slot in said bracket. An operating pull rope or cable 33 is attached to the free end of the clutch arm 28 and the ground wheel 5 has suitable cleats 34 to insure a rotation of said wheel during the travel of the implement.

Considering the frame and tool lowered, with the parts in the dotted line position as in Figure 1; to cause the power lift to become effective the operator pulls on the cable 33 rocking the clutch arm 28 against the tension of the spring 29 to bring the roller 31 against the periphery of the toothed disc 25 whereupon a tooth of said disc will engage the roller and through the arm 28 will bodily rotate the crank-shaft about the axis of the ground wheels and elevate the frame to withdraw the tool from the soil. As the frame nears its upper normal position the arm 28 will contact the stud 32 and will be cammed upward to disengage the roller 31 from the disc 25 and the wheel 5 can then rotate independently. The mechanism as herein described and illustrated, while well adapted for the purposes primarily stated is susceptible of various modifications without departing from the broad aspect of the invention, therefore, it is to be understood that such modifications are included in the scope of the claims which follow.

I claim:

1. In an implement of the class described the combination with a crank-shaft, of a ground wheel journaled on the end thereof, a frame journaled on the crank-pin portion of the shaft, a ground working tool carried by the frame, a stop member adjustable to different portions on the frame, an arm fixed to the crank-shaft and adapted to engage said stop member to limit the lowering of the frame, a latch lever cooperating with the frame when in elevated position to prevent a rotation of the shaft, a notched disc carried by the wheel, a spring normalized clutch arm adapted to be engaged with the disc to cause an elevation of the frame, and means functioning to throw out the clutch-arm near the end of the elevating movement of the frame.

2. In an implement of the class described the combination of a crank-shaft, ground wheels journaled on opposite ends of said shaft, a frame journaled on the crank-pin portion of the shaft, a ground working tool carried by the frame, an arm fixed to the crank-shaft, a latch lever carried by said arm and cooperating with the frame to prevent a rotation of the shaft relative to the frame for maintaining the frame against lowering and releasable to permit a free lowering of the frame, and means to limit the lowering of the frame.

3. In an implement of the class described the combination with a crank-shaft having its crank-pin portion extended laterally beyond its crank arm, of a ground wheel journaled on the end of the crank-shaft, a frame journaled on the crank-pin portion of the shaft inwardly of said crank-arm, a toothed disc fixed to said wheel, a clutch arm journaled on the extension of the crank-pin portion of the shaft, means for moving the clutch-arm into engagement with the disc to elevate the frame, and means disengaging said clutch-arm when the frame reaches its uppermost position.

4. In an implement of the class described the combination with a crank-shaft having its crank-pin portion extended laterally beyond its crank-arm, of a ground wheel journaled on the end of the shaft, a frame journaled on the crank-pin portion of the shaft inwardly of said crank-arm, a toothed disc fixed to the wheel, an arm secured to the lateral extension of the shaft, a clutch arm journaled on said lateral extension and adapted to be moved to engage the disc, a normalizing spring interposed between the arm secured to said extension and the clutch arm, and means functioning to disengage the clutch-arm during the elevation of the frame.

5. A crank-shaft for a self-lift agricultural implement, having a neck at each end to receive the ground wheels, a crank pin portion adapted to support the frame, with crank arms connecting the same with the necks, and a crank-pin spur on the outer side of one of the crank arms, substantially aligning with the said crank-pin portion for carrying clutch mechanism to connect the shaft to the adjacent wheel.

6. In an implement of the class described the combination of a crank-shaft, ground wheels journaled on the opposite ends of said shaft, a frame journaled on the crank-pin portion of the shaft, a ground working tool carried by the frame, a toothed disc fixed to one of the ground wheels, a clutch arm carried by the shaft and having a member adapted to engage a tooth of said disc, means yieldingly maintaining the clutch arm from engagement with the disc, means for moving said arm to engage the disc to cause a simultaneous rotation of the shaft and ground wheel to elevate the frame, means functioning to positively throw out the clutch arm near the end of the elevating movement of the frame, and means to maintain the frame in elevated position until released.

7. In an implement of the class described the combination of a crank shaft having a stud extending beyond one of the crank arms and in alignment with the crank pin portion of the shaft, ground wheels journaled upon opposite ends of said shaft, a frame journaled on the crank pin portion of the shaft between the crank arms, a ground working tool carried by the frame, a toothed disk fixed to one of the ground wheels, a clutch arm carried by the stud and having a member adapted to be moved into the path of the teeth of the disk to cause the shaft and the ground wheel to rotate simultaneously to elevate the frame, means functioning to throw out the clutch arm near the end of the elevating movement of the frame, and means to maintain the frame in elevated position until released.

Signed at Los Angeles, California, this 19th day of April, 1921.

HEBER F. TOWNER.

Witnesses:
J. L. BASCOM,
EUGENE A. ROBINSON.